United States Patent [19]

Metz et al.

[11] 4,360,912
[45] Nov. 23, 1982

[54] DISTRIBUTED STATUS REPORTING SYSTEM

[75] Inventors: Louis C. Metz, Shoreview; Leroy A. Prohofsky, Minneapolis, both of Minn.

[73] Assignee: Sperry Corporation, New York, N.Y.

[21] Appl. No.: 97,080

[22] Filed: Nov. 23, 1979

[51] Int. Cl.³ .............................................. H04J 3/02
[52] U.S. Cl. .................................. 370/96; 370/88; 370/90; 370/92; 340/825.54
[58] Field of Search ................... 370/88, 90, 96, 101, 370/92; 340/150, 825.54

[56] References Cited

U.S. PATENT DOCUMENTS

| | | | |
|---|---|---|---|
| 3,597,549 | 8/1971 | Farmer | 370/88 |
| 3,883,693 | 5/1975 | Moore | 370/88 |
| 3,889,064 | 6/1975 | Fletcher | 370/92 |
| 4,047,159 | 9/1977 | Boudry | 364/200 |
| 4,053,714 | 10/1977 | Long | 370/100 |
| 4,093,946 | 6/1978 | Fowler | 340/505 |
| 4,139,737 | 2/1979 | Shimada | 370/92 |

*Primary Examiner*—Douglas W. Olms
*Attorney, Agent, or Firm*—Douglas L. Tschida; Kenneth T. Grace; Marshall M. Truex

[57] ABSTRACT

A modular bus system for reporting the status of a plurality of geographically distributed data points. The data points may be independently located or grouped with the status of each being monitored by a processor which is coupled to the data points via a bus multiplexer, a plurality of buses and a plurality of single point and multiplexed transmitters. Each bus may be coupled to a plurality of the transmitters and may be configured open or closed loop. The system operates to simultaneously interrogate each of the buses via interrogation signals, which also supply the power to the transmitters, and produces a serial response signal containing the status information of the interrogated data points.

9 Claims, 12 Drawing Figures

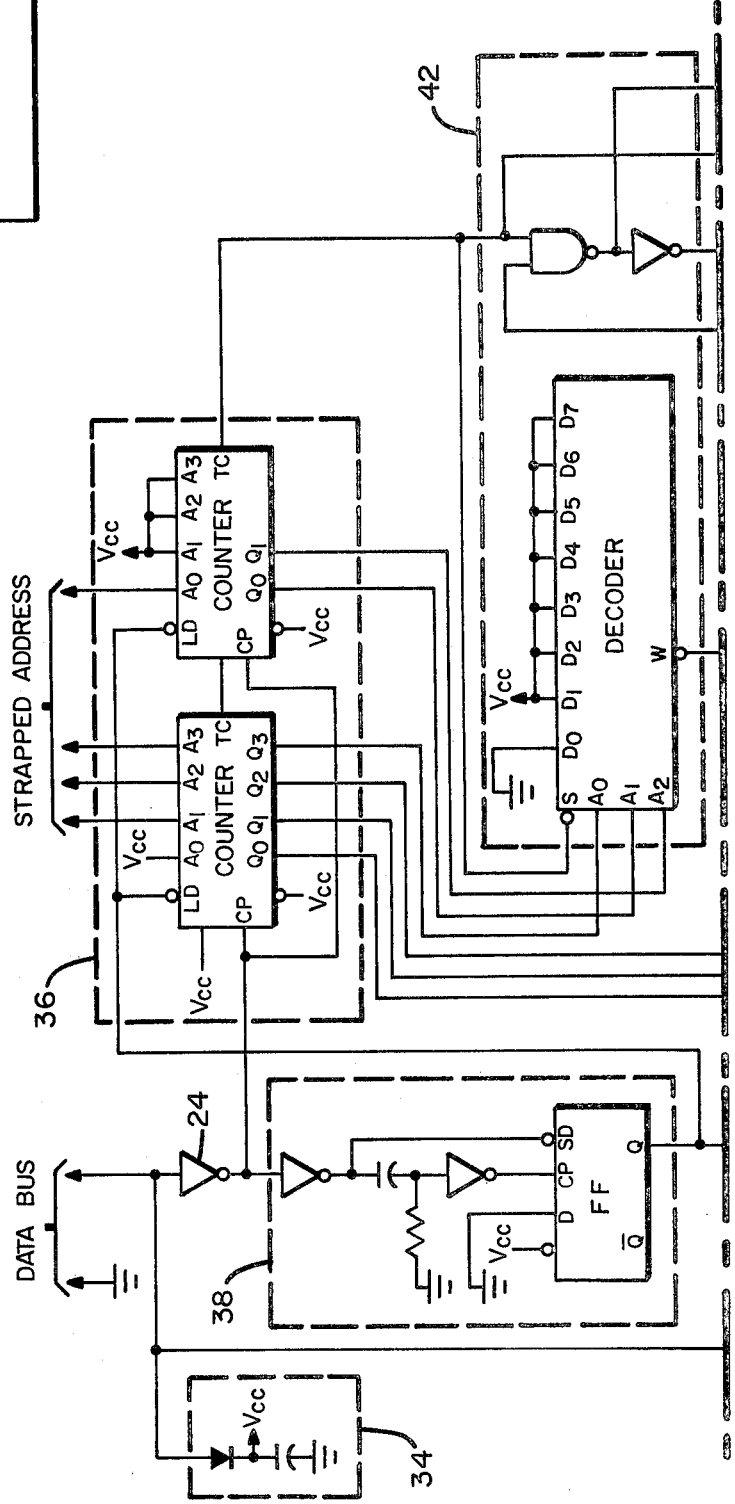

DISTRIBUTED STATUS REPORTING SYSTEM

BACKGROUND OF THE INVENTION

The present invention is related to distributed transmission systems for interrogating and monitoring the status of a number of remotely distributed data points, with. Such systems may exist in large buildings or onboard a ship or a plane, and the status information may consist of whether a hatch is open or closed, the temperature of a thermostat, etc. Typically in such systems, the individual data points are coupled to a processor in a point-to-point configuration on separate data buses or several data points may be multiplexed on one bus, but only one data point is interrogated at a time. An example of such a system is disclosed in U.S. Pat. No. 4,047,159 for remotely monitoring experimental instrumentation. Such systems, however, are relatively costly and require a great deal of hardware duplication for each channel and sub-channel and also require additional buffering and polling hardware to optimize system performance.

The present invention, however, is directed to a modular bus system for simultaneously interrogating a number of buses and the data points coupled thereto.

The present invention further discloses a bus system in which the transmitters are powered by the interrogation signals transmitted by the bus multiplexer.

SUMMARY OF THE INVENTION

The present invention discloses a modular bus system for monitoring the status of a plurality of geographically distributed data points, wherein each data point produces a digital response signal that is associated with some physical state such as whether an electrical contact is open or closed or the status of an analog device.

The bus system is comprised of a plurality of buses, a bus multiplexer and a plurality of transmitters. Each bus comprises a twisted pair cable over which interrogation and response information are communicated, and each bus is configured in an open or closed loop fashion with respect to the bus multiplexer.

The bus multiplexer operates to reproduce and transmit the processor interrogation signals to the transmitters and to serialize the transmitter response signals containing the status information of the interrogated data points. The bus multiplexer is comprised of an asynchronous transceiver, pulse generator and counter with decoder. Depending upon the processor interrogation signal, the appropriate sequences of pulses are generated by the bus multiplexer and are simultaneously transmitted to all transmitters on all buses to interrogate the status of each of the corresponding data points. The individual response signals from each of the responding transmitters are then received by the bus multiplexer, in parallel, and are then serialized for transmission to the processor where the serial response signals are software sorted and compared to ascertain the status of the associated data point.

The transmitters that are coupled to the associated data points are of two types, single point or multiplexed. Each operates to compare the interrogation signals from the bus multiplexer to a strapped address that is associated with a data point coupled to each transmitter and to couple the comparison generated response signal of the associated data point to the bus multiplexer. Each single transmitter is comprised of a presettable counter and timing circuitry that distinguish between the interrogation signals and insert the response signal on the bus at the appropriate time. Each single transmitter also produces a discrete output that may be used to indicate the data point's status at an intermediate monitor station or which may be used to operate the transmitter as a data receiver.

The multiplexed transmitters are similar to the single transmitters but each also contains a decoder, a register and multiplexer for distinguishing between the localized data points coupled to it and for distinguishing its data points from all others in the system.

BRIEF DESCRIPTION OF THE DRAWINGS

FIGS. 8a and 8b is a detailed circuit schematic of the multiplexed transmitter.

DESCRIPTION OF THE PREFERRED EMBODIMENT

Figure 1:
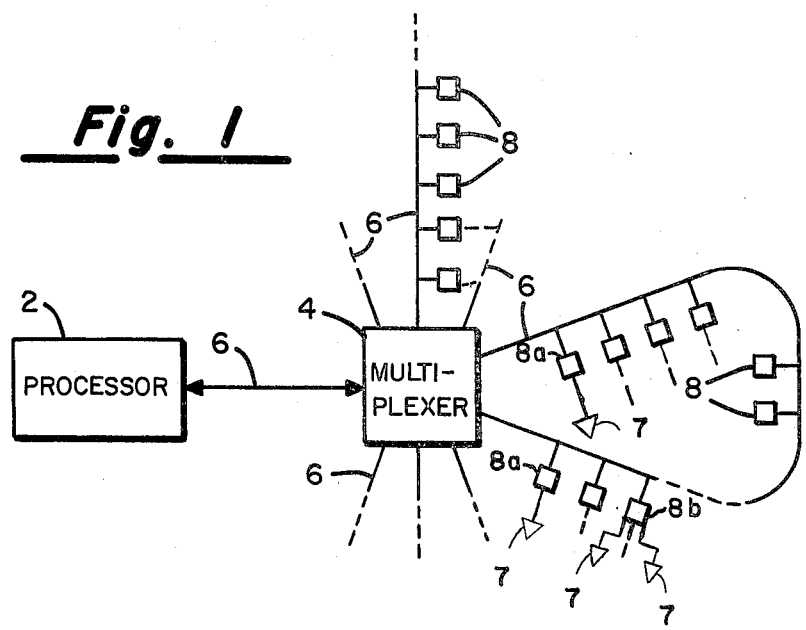
FIG. 1 is a system level block diagram indicating open and closed loop configurations in a system having single and multiplexed transmitters.

Referring to FIG. 1 the present invention is directed to a modular, reconfigurable bus system for interrogating the physical status of a number of geographically distributed data points, where each data point typically consists of a single electrical contact which is either open or closed or an analog transducer having its outputs converted to a digital signal. The system operates under the control of the processor 2 and is initiated when the processor 2 transmits interrogation signals to the bus multiplexer 4 which causes the bus multiplexer 4 to interrogate the status of all the data points 7 that are coupled to the communication buses 6 by their associated transmitter 8. The bus multiplexer, upon receipt of the interrogation signals, reproduces the signals in an appropriately modified manner and transmits the modified signals to all of the single point and multiplexed transmitters 8 where they are compared to a strapped address, A that is coupled to the transmitters by their associated data points 7. If an address match occurs, the associated data point's status response signal is transmitted back to the bus multiplexer 4. The bus multiplexer 4, in turn, serializes the individual status response signals from the addressed data point on each of the buses 6 and transmits the serial response signal to the processor 2 where the signal is analyzed under software control.

The present bus system can be configured in either an open or closed loop fashion with each of the data points 7 being coupled to the bus 6, typically twisted pair cable, via the single point or the multiplexed transmitters 8 which will be described in more detail hereinafter. It is to be noted that the present embodiment is directed to an open loop system which can accommodate up to eight data buses 6 at the bus multiplexer 4. Each bus 6 may be coupled to fifteen discrete data points 7 while each data point 7 has a four bit strapped address, A, hardwired to its associated transmitter 8. It is thus possible to accommodate 120 data points if all single point transmitters are used. If multiplexed transmitters are used, the system can accommodate 192 data points, assuming three multiplexed and three single point transmitters per input of the bus multiplexer 4. As illustrated in FIG. 1, each single transmitter 8a couples only a single data point 7 to the bus 6 while each multiplexed transmitter 8b may couple a plurality of data points 7 to the bus 6.

If the system is configured totally closed loop, it can accommodate either 60 or 92 data points, since the bus multiplexer 4 would be interrogating the same data points for each end of bus 6. The redundant closed loop system, however, enables the detection of failure conditions, such as the severing of the bus 6. The closed loop system also requires more processor time to sort the serial response signal received from the bus multiplexer 4 for each interrogation. The present invention, however, is not directed to the operations required within the processor 2, since they are primarily software oriented, and merely assumes that the processor 2 appropriately initiates the interrogation signals and that the consequent data handling operations occur under processor 2 control and are fixed at the time each system is configured.

Figure 2:
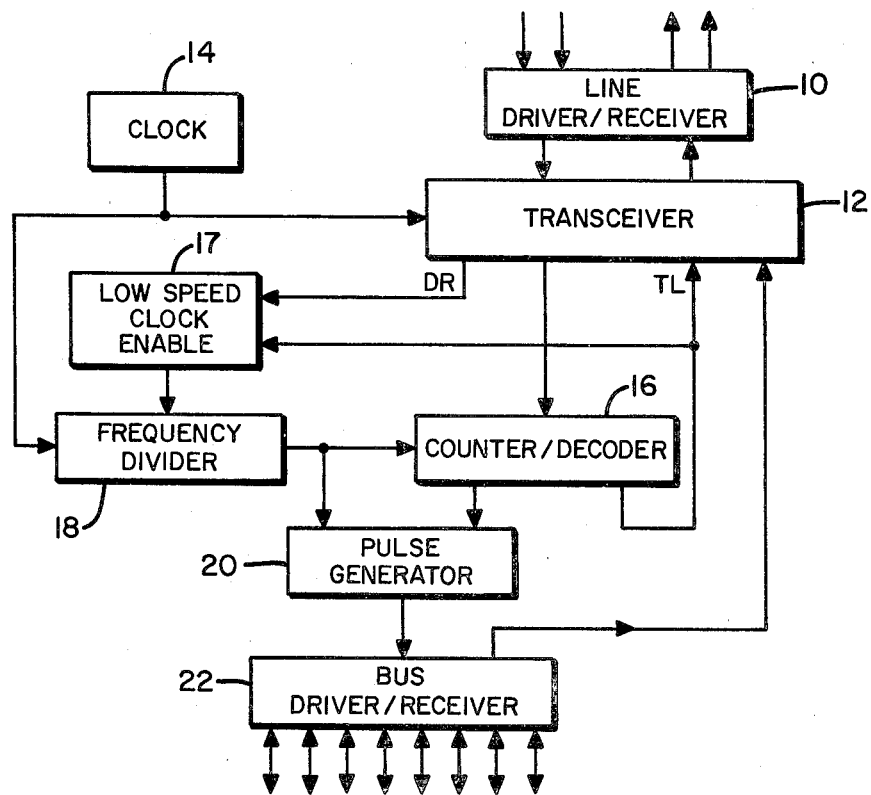
FIG. 2 is a functional block diagram of the bus multiplexer.
Figure 3:
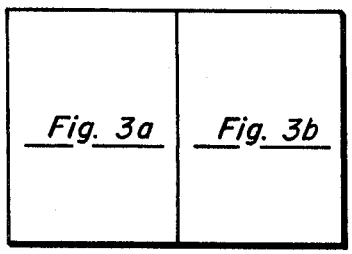
FIGS. 3a and 3b is a detailed circuit schematic of the bus multiplexer.
Figure 3A:
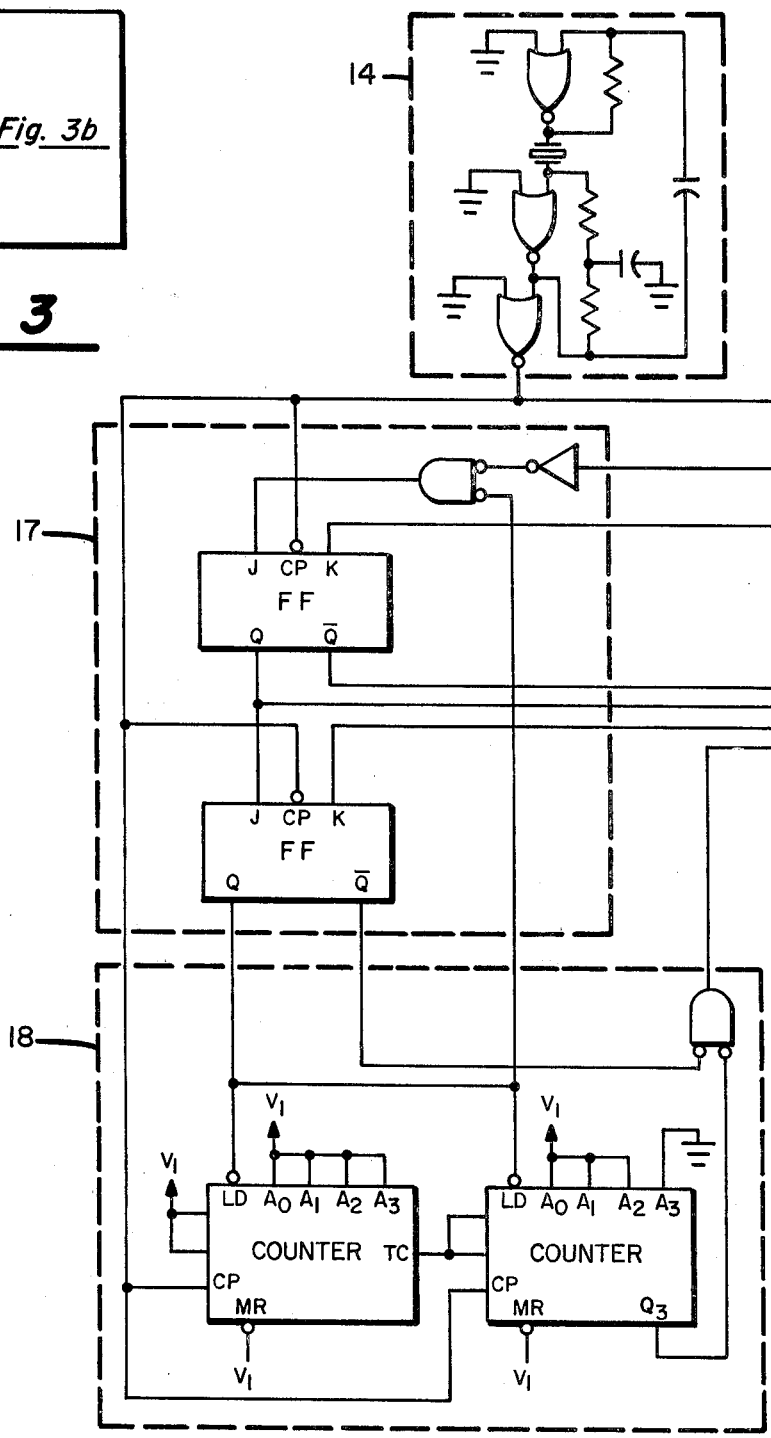
Figure 3B:
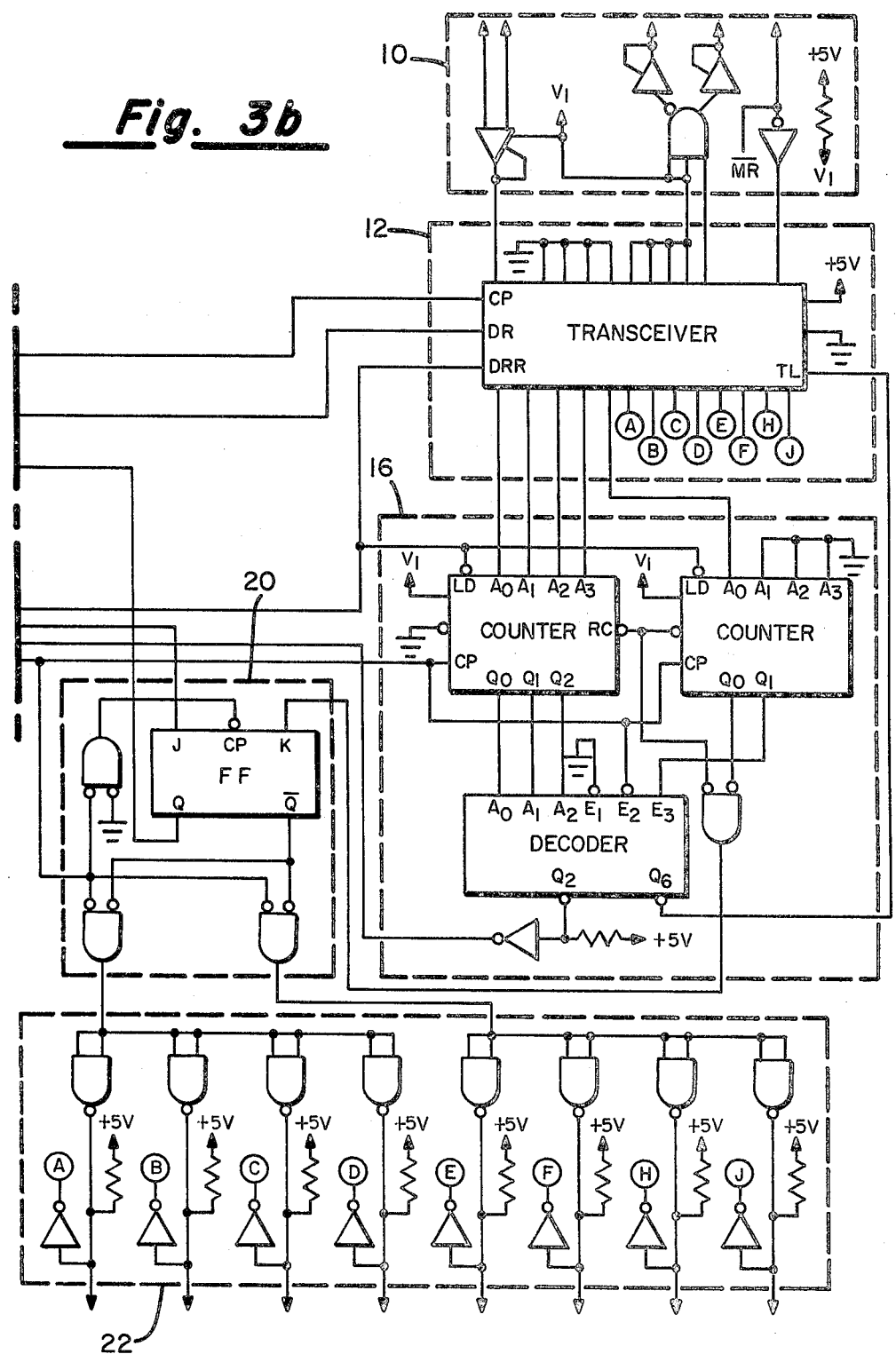
Figure 4:
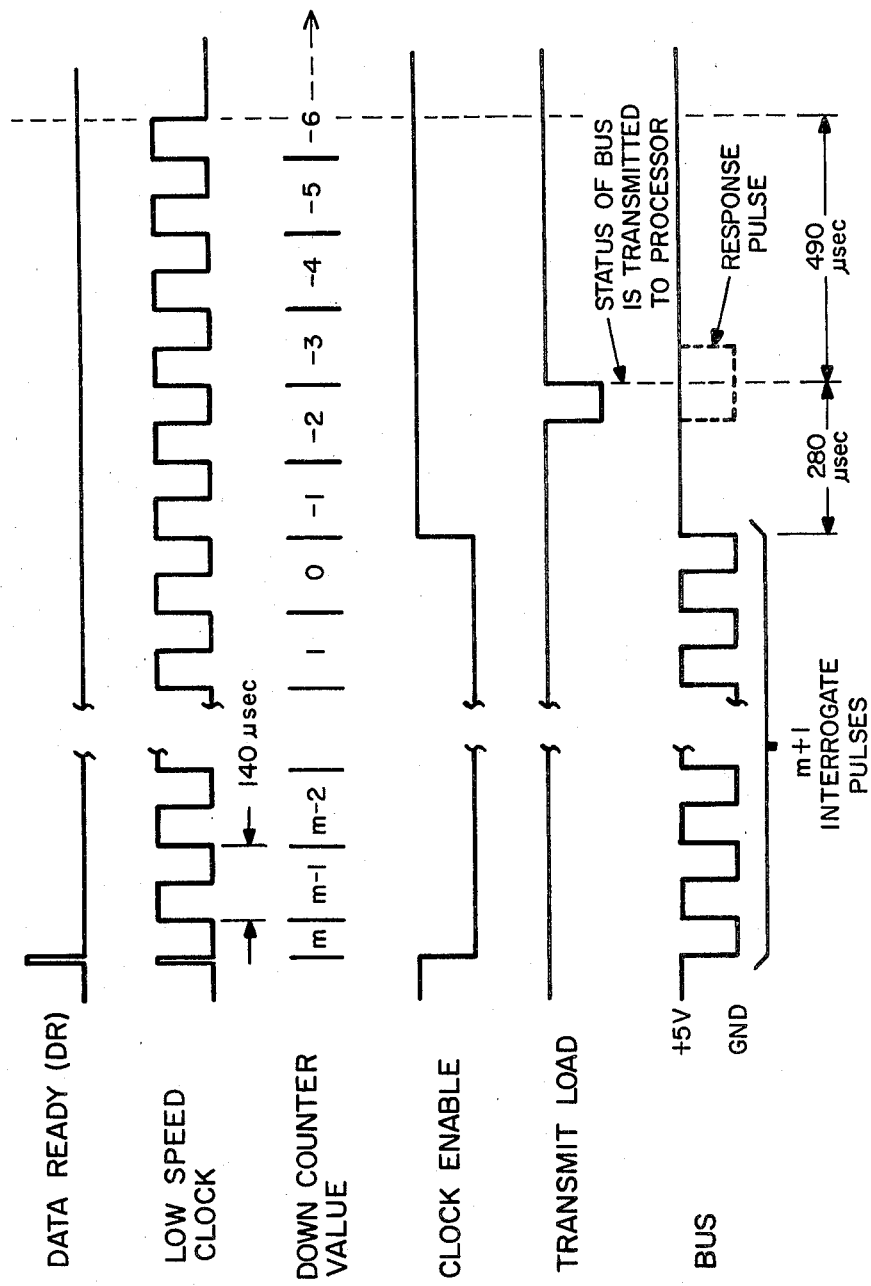
FIG. 4 is the timing diagram of a single interrogation cycle of the bus multiplexer.

The typical sequence of events that occur during each interrogation cycle of the system will now be described with reference to each system element and the bus timing diagram of FIG. 4. Referring to FIGS. 2, 3 and 4, as the line driver/receiver 10 receives the serial interrogation signal from the processor 2, typically a ±5 volt Baudot code corresponding to the strapped address, A, of one data point coupled to each of the buses 6, it couples the signal to the asynchronous transceiver 12, which is driven by the 1.8 MHz clock 14, where the signal is converted into a parallel, five bit, binary interrogation signal. Once the conversion is complete, a data ready (DR) signal is transmitted to the low speed clock enable logic circuitry 17 which enables frequency divider 18 and causes transceiver 12 to clear and load the interrogation signal into counter decoder 16, thus presetting the down count of counter/decoder 16 at a value of m. The enabling of the frequency divider 18 causes frequency divider 18 to disable the logic circuitry 17 during the remainder of the interrogation cycle and load and initiate its counters such that it divides down the 1.8 MHz clock signal to produce a 7.03 KHz clock signal which is then used to clock counter/decoder 16 and pulse generator 20. It is also to be noted that the enabling of frequency divider 18 causes pulse generator 20 to produce one additional pulse. As counter/decoder 16 counts down from its preset m value, it causes pulse generator 20 to produce one pulse for each low speed clock cycle, typically 140 μsec, for as long as the value in counter/decoder 16 is greater than or equal to zero. As a consequence, the bus multiplexer 4 produces a serial pulse train of m+1 pulses which serial pulse train is transmitted from each of the eight output ports of bus driver/receiver 22 to all the single point and multiplexed transmitters 8 coupled to the buses 6.

With the transmission of the last pulse during the zero count period, counter 1 decoder 16 continues to count down to a value of a minus 6, which establishes a 770 μsec time period. During this time, the response pulse from each of the transmitters having the strapped address, A, corresponding to the number of pulses in the pulse train is received and transmitted to the processor 2. In particular, during the last half of the minus two count period, typically 280 μsec later, counter/decoder 16 couples a transmit load, TL, signal to the TL terminal of transceiver 12 which causes the transmitter 8 response signals waiting on the input ports A through J of bus driver/receiver 22 to be loaded into transceiver 12. The response signals are loaded into transceiver 12 in parallel but during the next 490 μsec, while counter/decoder 16 counts down to a minus 6, the response signals are transmitted via the line driver/receiver 10 in a serial fashion to the processor 2 for sorting and analysis. The 490 μsec period also enables each of the transmitters 8 to clear prior to receipt of the next interrogation pulse train, thus preventing any spurious response pulses from being transmitted.

Prior to continuing the description of the detailed operation of the single point and multiplexed transmitters, a few design characteristics should be noted. In particular it should be noted that the least significant bit position, $A_o$, of the transmitter inputs are not used for address interrogation information, which dictates that m equal two times the value of the strapped address (M=2A) being interrogated. It should also be noted that for the present system, the first pulse is not recognized by the transmitters 8 as part of an interrogation signal, but rather is used to initiate and load the transmitters 8 with their strapped address; the transmitters 8 therefore respond only if they receive two times the value of their strapped address plus one pulse. It should be further noted that to fully interrogate the status of any data point associated with a single point transmitter, it is necessary to transmit two pulse trains of (m+1) and (m+2) pulses in succession and then compare the serial response signals in the processor 2 according to the interpretations of Table I.

TABLE I

| m + 1 | m + 2 | Meaning |
|---|---|---|
| 0 | 0 | Error or Faulty Bus (open) |
| 0 | 1 | Switch is Open or Input is High |
| 1 | 0 | Switch is Closed or Input is Low |
| 1 | 1 | Error or Faulty Bus (shorted) |

Where the presence of a transmitter response pulse (i.e., a logic "low" on the bus 6) is interpreted to be a binary 1 and the absence of a response pulse (i.e., the bus remains at a logic "high") is interpreted to be a binary zero.

It should also be noted that an error may occur because the status of the data point changed during interrogation in which event the processor can repeat the interrogation to determine if an error occurred or a fault exists. It should be further noted that the response signals are typically received simultaneously on the input ports of driver/receiver 22. Each individual pulse of the response signal is coupled to an associated one of the input terminals of the driver/receiver 22 with the least significant bit (LSB) of the response signal coupled to input port A and the most significant bit (MSB) coupled to the input port J.

Figure 5:
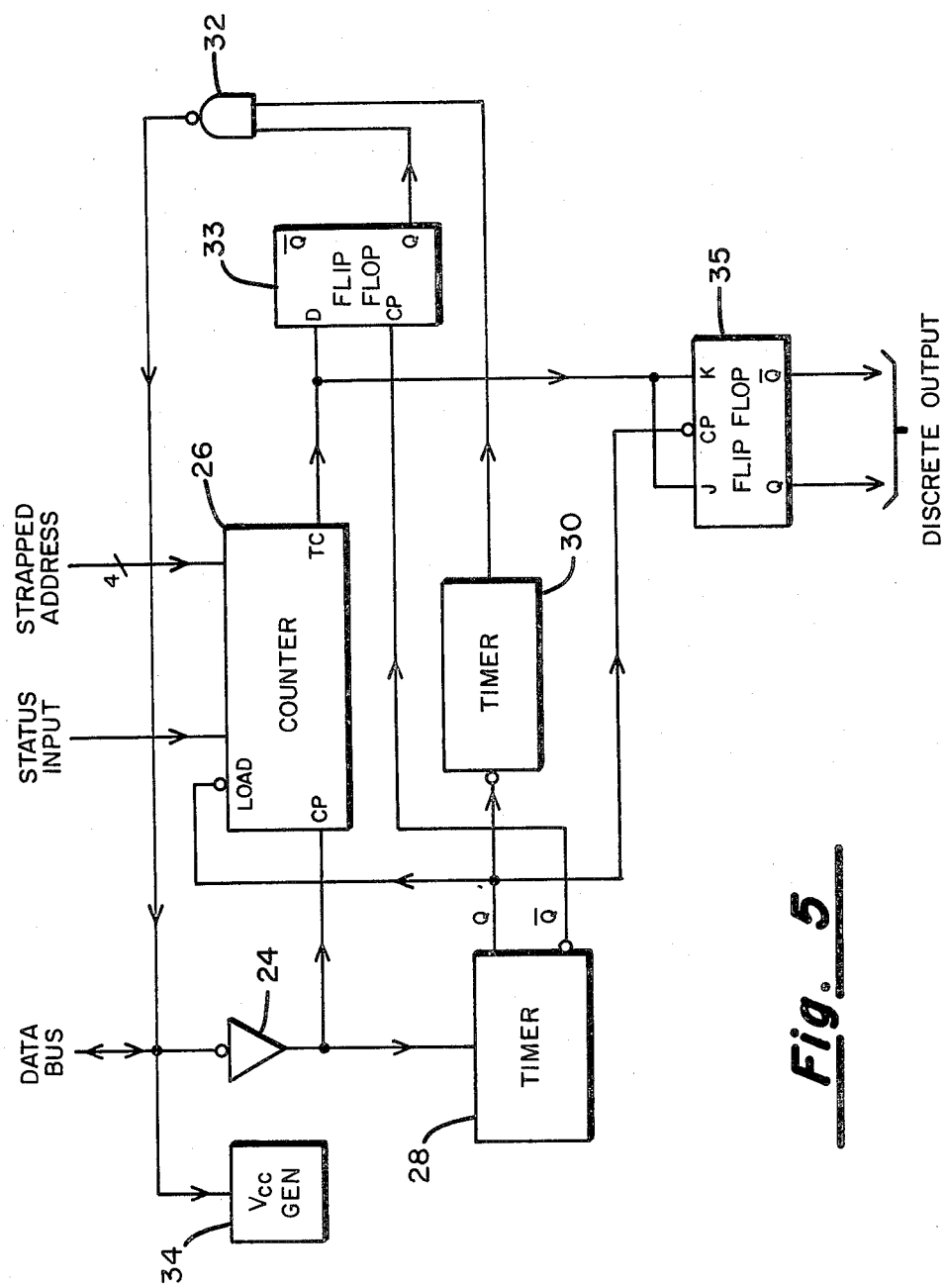
FIG. 5 is a functional block diagram of a single point transmitter associated with a discrete data point.
Figure 6:
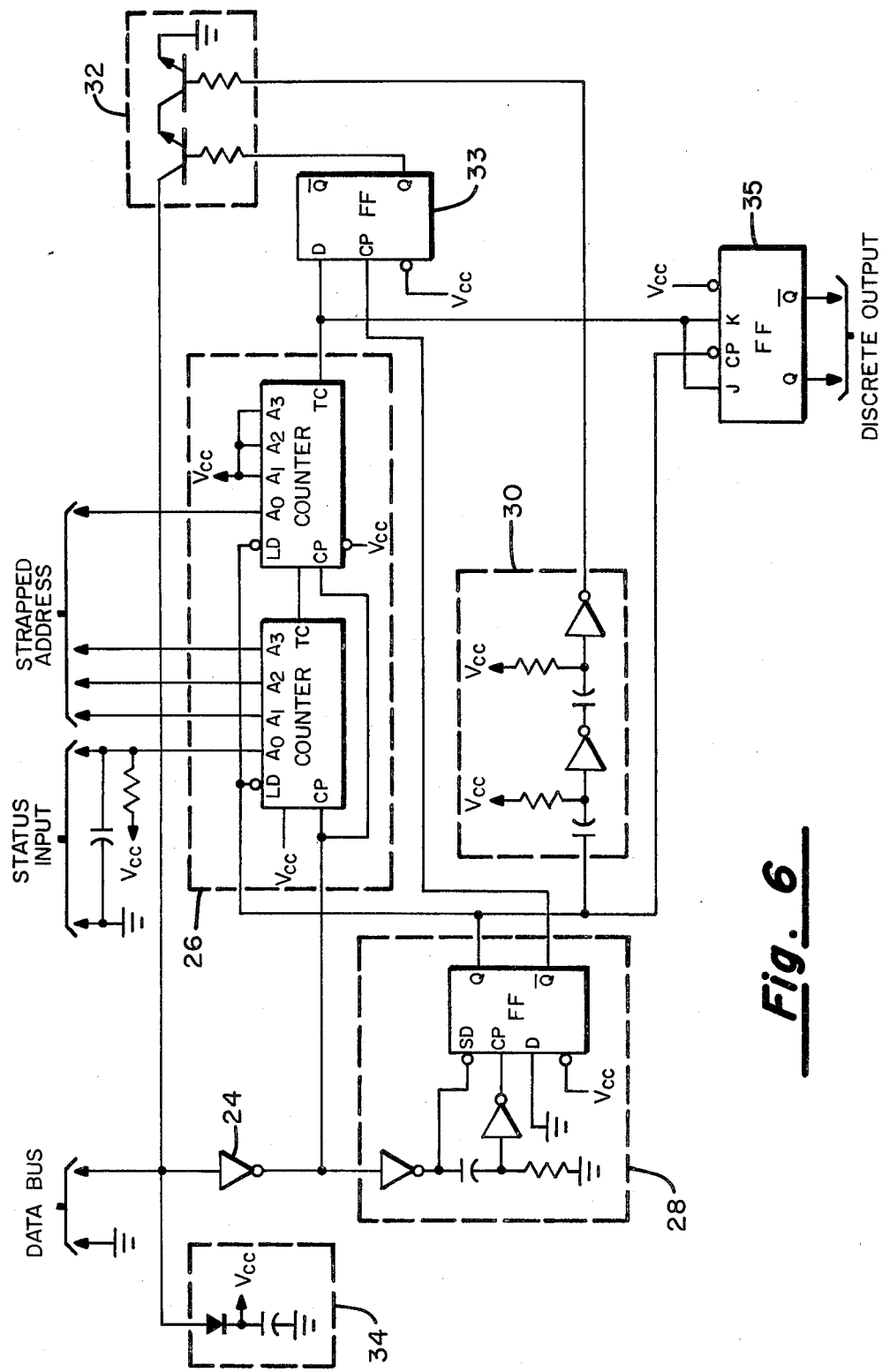
FIG. 6 is a detailed circuit schematic of the single point transmitter.

Referring now to FIGS. 4, 5 and 6, the operation of the single point transmitter will now be described. It is to be recognized though that the same sequence of events occurs within each single point transmitter coupled to each of the buses 6. Upon receipt of the first pulse from the bus multiplexer 4, the receiver 24, typically a Schmitt trigger, produces a noise free, square wave pulse which causes timer 28, typically a retriggerable single shot, to begin timing and counter 26 to load its 4 bit strapped address, A, and the status input of its associated data point, which is coupled to the $A_o$ bit position of counter 26. Once the Q terminal of timer 28 achieves a logic "high", counter 26 will count up on receipt of subsequent pulses. Each subsequent pulse will cause the counter 26 to advance and timer 28 to reset its time to zero. The Q terminal of timer 28 will thus remain "high" until approximately one pulse period beyond the end of the pulse train. Thus following the end of the pulse train, the binary signal on the terminal count, TC, terminal of counter 26 will correspond with one of the conditions established in Table II.

TABLE II

| Number of Pulses in Train | Status Input | Counter 26 (lower 5 bits) | TC |
|---|---|---|---|
| 1 thru 2A | X | ≦11110 | 0 |
| 2A + 1 | 0 | 11110 | 0 |
|  | 1 | 11111 | 1 |
| 2A + 2 | 0 | 11111 | 1 |
|  | 1 | 00000 | 0 |
| ≧2A + 3 | X | ≧00000 | 0 |

Where X implies that the status does not matter.

When timer 28 times out, its Q terminal goes "high" and causes the signal at the TC terminal of counter 26 to be stored in the D flip-flop 33. At the same time its $\bar{Q}$ terminal goes "low" and triggers timer 30. Timer 30, which consists of two series coupled single-shots, will delay approximately one half clock pulse period, nominally 70 μsec, and then produce an output pulse of approximately one pulse period, nominally 140 μsec. If the condition of the TC terminal of counter 26 is "high" (i.e., 2A+1 pulses and a status of 0 or 2A+2 pulses and a status of 1) terminal Q of the flip-flop 33 will be "high" and line driver 32, a logical NAND circuit, will transmit a "low" response signal over the data bus 6 to the bus multiplexer 4. If the TC terminal is "low", a "high" response signal (i.e., the bus remains at a logic "high") will be transmitted.

If it is desired to use a single point transmitter as a data receiver rather than a data transmitter, the $\bar{Q}$ or Q terminal of the J-K flip-flop 35 is connected to the status input and the other to the data point's input and/or a monitor station and the operation of the transmitter remains the same as during normal data transmission operations. Assuming $\bar{Q}$ is coupled to the status input, if it is desired to set flip-flop 35, a pulse train of 2A+1 pulses is applied. If flip-flop 35 was previously set, the status on the $\bar{Q}$ terminal will be "low", the TC terminal of counter 26 coupled to the J and K inputs will be "low" and flip-flop 35 will remain set. If flip-flop 35 was previously cleared, the status on the $\bar{Q}$ terminal will be "high", the TC terminal of counter 26 will be "high" and flip-flop 35 will change state to the set condition. If it is desired to clear flip-flop 35, a pulse train of 2A+2 pulses is applied and the response will be similar to that described for setting the previously set or cleared flip-flop 35. Typically, however, the previous state of flip-flop 35 is known and the appropriate pulse train is applied to force a change of state and thereby affect the status of the data point.

Whenever a setting or clearing operation causes the flip-flop 35 to change state, a response signal is produced identical to that produced in normal data transmitter operation. This response signal is then observed by the processor 2 as a confirmation of the change of state. Thus it is possible to vary the discrete output of selected data points and monitor the operation to ensure the change, thereby confirming system integrity. It is to be recognized though that, during the operation of the single point transmitters as a data receiver, all but one of the NAND gates of bus driver/receiver 22 will have their inputs disabled so that only one of the data points corresponding to the pulse train will be affected.

It should also be recognized that the system's single point transmitters, as well as the multiplexed transmitters, are fabricated from low power, complementary metal-oxide semiconductor (CMOS) parts which enables each transmitter 8 to operate without a separate power supply. The transmitter, instead, derives its power from the bus multiplexer 4 interrogation pulse trains via the Vcc generator 34 which converts part of the energy in the pulse trains to a constant Vcc voltage which is coupled to the power pins of each discrete part. Specifically, the Vcc generator consists of a series coupled diode-capacitor combination and the Vcc voltage is the voltage that develops across the capacitor.

While many systems may have widely dispersed data points, the data points may also be geographically concentrated. In such concentrated circumstances, a hardware savings can be achieved with the multiplexed transmitter shown in FIGS. 7 and 8 and at the same time realize an increase in the number of addressable data points per bus multiplexer 4 input port and a reduction in interrogation time. The multiplexed transmitter achieves these ends by requiring fewer terminals per loop and fewer pulse trains to interrogate the data points coupled to the multiplexed transmitter. The multiplexed data points can be completely interrogated with eight pulse trains, whereas an equivalent number of single point transmitters require fourteen pulse trains.

Figure 7:
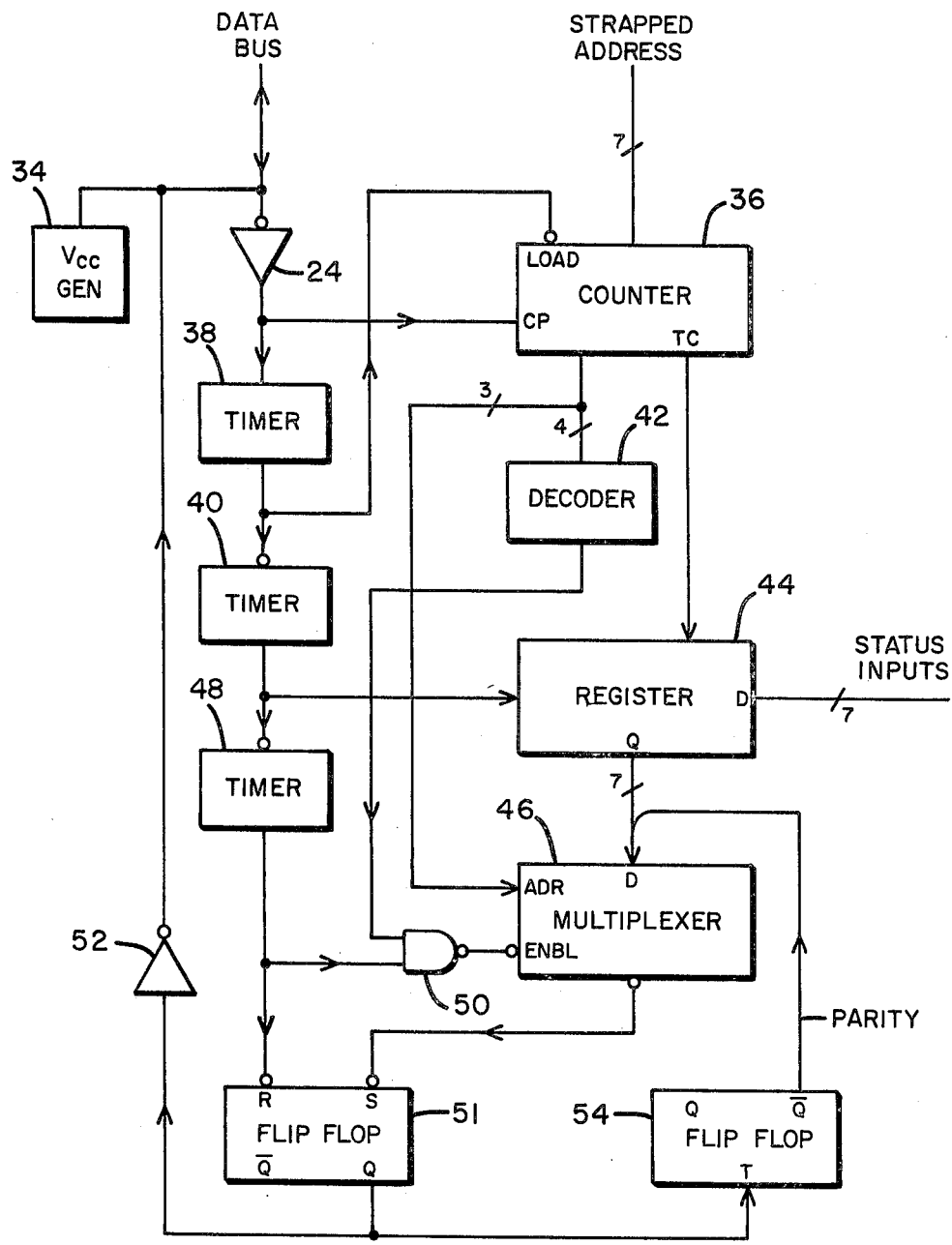
FIG. 7 is a functional block diagram of a multiplexed transmitter.
Figure 8B:
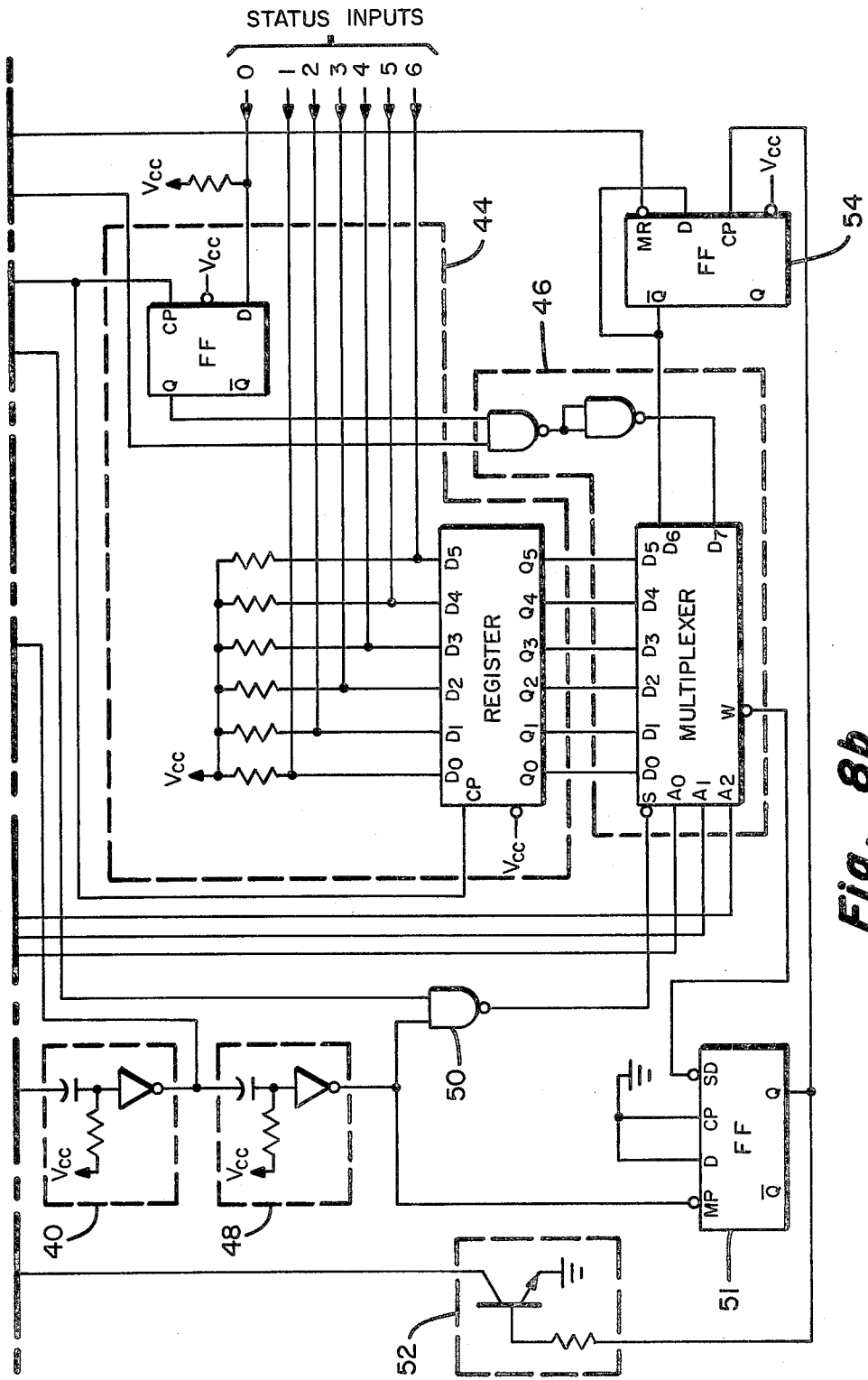

Referring now to FIGS. 7 and 8, a seven bit multiplexed transmitter is shown which is comprised of similar CMOS parts and operates in a similar fashion to the single data point transmitter previously described. The multiplexed transmitter requires four of a bus's addresses to accommodate seven data points, whereas the single point transmitter required one address per data point. The seven data points are thus grouped and represented by four bit positions, but the least significant bit position of the strapped address now corresponds to a wired "high".

A typical sequence of events will now be described with reference to the selection of the status information on status input "0" and the transmission of the corresponding response signal. When the multiplexed transmitter receives the first pulse of the (2A+1) pulse train, timer 38, typically a retriggerable single-shot, is initiated and counter 36 is loaded with strapped address A, thus permitting counter 36 to count on the successive pulses. Since the address being interrogated with the (2A+1) pulse train corresponds to the status input "0", the strapped address will match the count and the TC terminal will indicate a logic "high" at the end of the pulse train. When timer 38 times out, approximately one pulse period after the interrogation pulse train, timer 40 is initiated and produces a logic "high" which remains, approximately one-half pulse period. The logic "high's" from counter 36 and timer 40 then cause register 44 to impress the status inputs "0" through "6" of the seven discrete data points on the inputs $D_0$ to $D_5$ and $D_7$ of multiplexer 46. At the same time, three bits of the count information in counter 36 (i.e., a binary 111) corresponding to status input "0" bit position in register 44 are impressed on the select inputs $A_0$ through $A_2$ of multiplexer 46 and four bits indicating a match of the strapped address are impressed on decoder 42, causing decoder 42 to produce a logic "high".

Upon timer 40 timing out, a logic "low" is produced which causes timer 48 to begin timing and produce a logic "high". NAND gate 50 responding to the logic "high's" from timer 48 and decoder 42 produces a logic "low" which enables multiplexer 46 to select the information resident at its $D_7$ bit position which corresponds to the status input "0".

Referring to Table III the effects of the pulse trains of (2A+2) through (2A+8) are shown and which are used to interrogate the remaining status bits 1 through 6 and the parity bit 7. It is to be noted that register 44 is loaded only on the (2A+1) pulse train, since typically the processor 2 interrogates each strapped address sequentially.

Once the information in the status input "0" bit position is selected, it is next stored in flip-flop 51. This occurs since decoder 42 produces a logic "high" on its output terminal W for each of the eight sequential pulse trains of Table III. Thus as timer 48 goes "high", NAND gate 50 causes multiplexer 46 to load flip-flop 51. If a logic "high" is present on the selected status input or parity bit position of multi-plexer 46, flip-flop 51 will set for the duration of the timer 48 "high" output. The resulting "high" output on the Q terminal of set flip-flop 51 will then cause line driver 52 to produce a logic "low" which will be transmitted to multiplexer 4. In a similar manner, if flip-flop 51 is cleared, a logic "high" is transmitted.

TABLE III

| Number of Pulses in Train | Counter 36 (lower 6 bits) | TC | Load Reg. 44 | Multiplexer 46 Selects Input # | Data Response Pulse = |
|---|---|---|---|---|---|
| 1 thru 2A | ≤111110 | 0 | No | X | None |
| 2A + 1 | 111111 | 1 | Yes | 7 | Status Bit 0 |
| 2A + 2 | 000000 | 0 | No | 0 | Status Bit 1 |
| 2A + 3 | 000001 | 0 | No | 1 | Status Bit 2 |
| 2A + 4 | 000010 | 0 | No | 2 | Status Bit 3 |
| 2A + 5 | 000011 | 0 | No | 3 | Status Bit 4 |
| 2A + 6 | 000100 | 0 | No | 4 | Status Bit 5 |
| 2A + 7 | 000101 | 0 | No | 5 | Status Bit 6 |
| 2A + 8 | 000110 | 0 | No | 6 | Parity Bit |
| ≥2A + 9 | ≥000111 | 0 | No | X | None |

As the status inputs are sequentially addressed, an "odd" parity bit, associated with the $D_6$ bit position of multiplexer 46, is also generated in the following manner. At the time register 44 is first loaded, the parity flip-flop 54 is cleared which indicates that an even number of "1's" zero at this point in time have been transmitted. However, when a "1" is transmitted, its trailing edge, signified by the Q terminal of flip-flop 51 going "low", causes the parity flip-flop 54 to toggle (i.e., reverse status). Thus the transmission of an odd number of "ones" will leave the parity flip-flop 54 set and an even number will leave it cleared. When the parity bit is selected on the (2A+8) pulse train, the status of the $\overline{Q}$ terminal of flip-flop 54 is selected by the multiplexer 46. If an even number of "1's" has been transmitted, $\overline{Q}$ will be "high" thus transmitting an additional "1". If an odd number of ones has been transmitted, $\overline{Q}$ will be "low" and a "0" will be sent. It should be noted that the processor could cause the failure of the parity generation by failing to perform the interrogations in the order indicated, but the processor is considered to be "smart" enough not to do this.

The bus multiplexer 4, upon receipt of the interrogated transmitter's response signals at input ports A through J, transmits the information in the manner previously described back to processor 2 via the asynchronous transceiver 12 and line driver/receiver 10. The processor 2, then under software of firmware control, processes the information, which activity is dependent on the configuration of the system selected from the possible permutations of transmitters on each of the open or closed loop data buses 6.

While the invention has been described and depicted with reference to an open loop configuration, it is to be recognized that other configurations and embodiments are conceivable to one skilled in the art without departing from the spirit and scope of the invention claimed.

What is claimed is:

1. A status reporting system, comprising:
a plurality of communication buses;
a plurality of data points;
a plurality of transmitter means, each coupling at least an associated one of said data points to an associated one of said communication buses for transmitting signals therebetween;
processor means;
multiplexer means coupled to said processor means and said plurality of communication buses for simultaneously coupling an address signal to said plurality of communication buses, said address signal simultaneously selecting only an addressed one of the plurality of data points that are coupled to each of said communication buses;
at least a predetermined one of said plurality of transmitter means selected for coupling at least two of said data points to the associated communication bus; and
each of said transmitter means, data point combinations including means for generating a status response signal when said address signal selects the addressed one of said data points and for simultaneously coupling the status response signal from each of the addressed ones of said data points to said communication buses and thence to said multiplexer for transmission to said processor means in a modified form.

2. The status reporting system of claim 1 wherein each of said transmitter means includes means for changing the status of the selected ones of said data points in response to said address signal.

3. The status reporting system of claim 2 wherein each of said transmitter means further includes means for generating a signal, for transmission to said multiplexer means, that verifies that said status has been changed.

4. The status reporting system of claim 1 wherein each of said transmitter means further includes means for changing the addressed ones of said data points from a status responding data point to a data receiving data point.

5. The status reporting system of claim 1 wherein at least one of said communication buses is coupled on both ends to said multiplexer means.

6. The status reporting system of claim 1 wherein said multiplexer means receives an interrogation signal from said processor means and modifies said interrogation signal from said processor means for simultaneously transmitting a modified interrogation signal, which includes said address signal, to said plurality of communication buses, and wherein said address signal includes a serial pulse train, the number of pulses of which is representative of the address of the to-be-addressed data point.

7. The status reporting system of claim 1 wherein each of said plurality of transmitter means further includes strapped address means for decoding a strapped address coupled thereto from the associated data point and comparing said decoded strapped address to said address signal for indicating an address match.

8. The status reporting system of claim 1 wherein said predetermined one of said plurality of transmitter means further includes strapped address means for decoding the strapped address coupled thereto by said associated data points for selecting only the addressed one of said plurality of associated data points.

9. The status reporting system of claim 1 wherein said address signal is comprised of a serial pulse train, the number of pulses, or pulse count, indicating the address of the addressed data point, each of said plurality of transmitter means including counting means for counting the number of pulses in said serial pulse train and decoding means for enabling one of said transmitting means to couple the addressed associated data point's status signal to the associated communication bus and thence to said multiplexer means.

* * * * *